(No Model.)
R. D. SHINDELBOWER & H. PRESSLER.
SUGAR EVAPORATOR.
No. 279,450. Patented June 12, 1883.
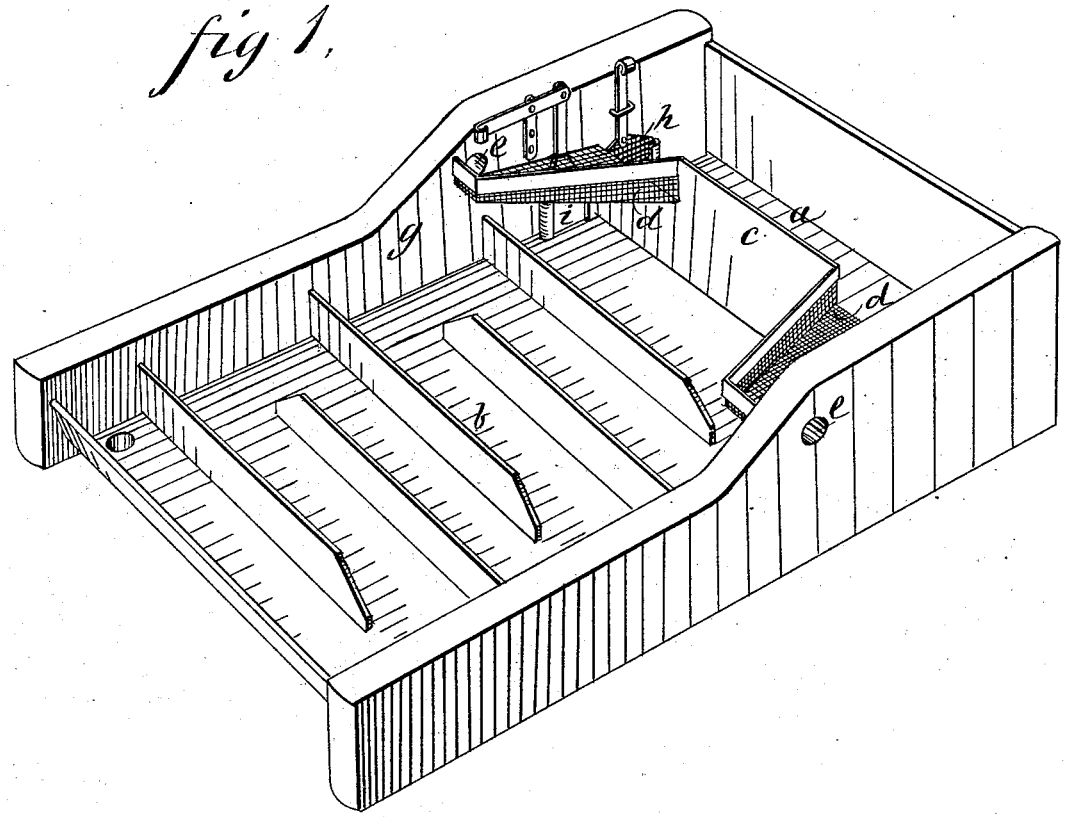
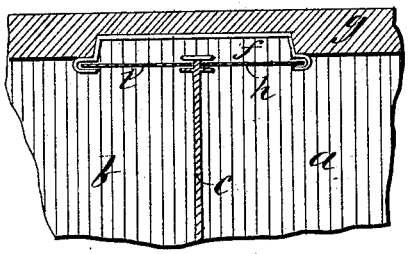

UNITED STATES PATENT OFFICE.

RICHARD D. SHINDELBOWER AND HENRY PRESSLER, OF LOUISVILLE, KENTUCKY.

SUGAR-EVAPORATOR.

SPECIFICATION forming part of Letters Patent No. 279,450, dated June 12, 1883.

Application filed December 8, 1882. (No model.)

*To all whom it may concern:*

Be it known that we, RICHARD D. SHINDELBOWER and HENRY PRESSLER, both of Louisville, in the county of Jefferson and State of Kentucky, have invented a new and Improved Sugar-Evaporator, of which the following is a full, clear, and exact description.

Our invention consists of an improved contrivance of skimmer attachments to boiling-pans, whereby the juice is to be automatically skimmed as it boils up and flows over from the boiling part to the finishing part of the pan; and it also consists of an improved contrivance of the passage for the flow of the juice from the said boiling part to the finishing part, so that said passage is wholly contained in the pan to avoid cutting through it and making outside joints, which cause leaks over the fire, all as hereinafter fully described.

Reference is to be had to the accompanying drawings, forming part of this specification, in which similar letters of reference indicate corresponding parts in both the figures.

Figure 1 is a perspective view of our improved evaporating-pan, and Fig. 2 is a detail in horizontal section.

The boiling part $a$, that is located over the fire, is separated from the finishing part $b$ by the partition $c$, in connection with which we arrange the strainers $d$ at the ends, said strainers being located a little below the middle portion of the partition, so that the juice boiling up in the middle of the part $a$ and flowing each way to the end will pass onto the strainers, when the scum will be separated and flow out of the discharge-passages $e$, while the juice passes through said strainers with the finishing part $b$ of the pan, and thus will be automatically skimmed. For the passage through which the juice is to pass around partition $c$ from $a$ into $b$ we make the conduit $f$ in one of the sides, $g$, of the pan around the end of said partition, with a strainer-gate, $h$, at the entrance from part $a$ to skim or strain the juice before entering said conduit, and with a close gate, $i$, at the junction of said conduit with the part $b$, to be employed when the flow of the juice is to be stopped.

It will be seen that by this construction of said conduit the cutting of holes through the bottom of the pan, and also the making of connections below, where the joints are exposed to the fire, are avoided, and the leaks common to such connections by the melting of solder are avoided.

Having thus described our invention, what we claim as new, and desire to secure by Letters Patent, is—

1. In an evaporating-pan, one or more strainers, $d$, located at the partition $c$, and having a discharge-passage, $e$, through the side of the pan, substantially as described.

2. In an evaporating-pan, the conduit $f$, leading from the boiling part $a$ into the finishing part $b$, located in one of the sides, $g$, of the pan, and above the bottom of said pan, substantially as described.

3. In an evaporating-pan, the conduit $f$, leading from the boiling part $a$ to the finishing part $b$, located in one of the sides, $g$, of the pan, and provided with the straining-gate $h$ and the close gate $i$, substantially as described.

RICHARD D. SHINDELBOWER,
HENRY PRESSLER.

Witnesses:
WM. T. THURMAN,
ALLEN L. MCAFEE.